United States Patent
Israelsohn et al.

(10) Patent No.: US 7,050,706 B2
(45) Date of Patent: May 23, 2006

(54) SYSTEM AND METHOD FOR RAPID HEATING OF FLUID

(75) Inventors: Cedric Israelsohn, Doncaster (AU); Robert C. Van Aken, Prahran (AU)

(73) Assignee: Microheat Pty Ltd., Prahran (AU)

( * ) Notice: Subject to any disclaimer, the term of this patent is extended or adjusted under 35 U.S.C. 154(b) by 247 days.

(21) Appl. No.: 10/486,763

(22) PCT Filed: Aug. 12, 2002

(86) PCT No.: PCT/AU02/01084
§ 371 (c)(1),
(2), (4) Date: Aug. 20, 2004

(87) PCT Pub. No.: WO03/016791
PCT Pub. Date: Feb. 27, 2003

(65) Prior Publication Data
US 2005/0013595 A1 Jan. 20, 2005

(30) Foreign Application Priority Data
Aug. 13, 2001 (AU) ............................................. PR 6973
Oct. 29, 2001 (AU) ............................................. PR 8551

(51) Int. Cl.
*H05B 3/60* (2006.01)

(52) U.S. Cl. ........................ 392/316; 392/465; 392/314
(58) Field of Classification Search ......... 392/311–321, 392/465, 466
See application file for complete search history.

(56) References Cited

U.S. PATENT DOCUMENTS

| | | | |
|---|---|---|---|
| 3,864,543 A | 2/1975 | Mohr | |
| 3,867,610 A | 2/1975 | Quaintance | |
| 4,029,937 A | 6/1977 | Russell | |
| 4,093,847 A | 6/1978 | Walker et al. | |
| 5,506,391 A | 4/1996 | Burayez et al. | |

FOREIGN PATENT DOCUMENTS

DE 3630972 6/1987

*Primary Examiner*—Thor Campbell
(74) *Attorney, Agent, or Firm*—Greer, Burns & Crain, Ltd.

(57) ABSTRACT

Apparatus for rapidly heating fluid includes a fluid circuit having electrodes between which the fluids flows. A voltage is applied between a pair of electrodes whereby current is caused to flow through the fluid. The inlet and outlet fluid temperatures are measured and the current controlled by varying the applied voltage to produce a desired temperature rise in the fluid in accordance with measured fluid flow rate.

26 Claims, 3 Drawing Sheets

SYSTEM AND METHOD FOR RAPID HEATING OF FLUID

FIELD OF THE INVENTION

The present invention relates to an apparatus, a system and method for the rapid heating of fluid and more particularly, to an apparatus, system and method for rapidly heating fluid using electrical energy.

BACKGROUND OF THE INVENTION

Hot water systems of one form or another are installed in the vast majority of residential and business premises in developed countries. In some countries, the most common energy source for the heating of water is electricity.

Of course, as it is generally known, the generation of electricity by the burning of fossil fuels significantly contributes to pollution and global warming. For example, in 1996, the largest electricity consuming sector in the United States were residential households, which were responsible for 20% of all carbon emissions produced. Of the total carbon emissions from this electricity-consuming sector, 63% were directly attributable to the burning of fossil fuels used to generate electricity for that sector.

In developed nations, electricity is now considered a practical necessity for residential premises and with electricity consumption per household growing at approximately 1.5% per annum since 1990 the projected increase in electricity consumption for the residential sector has become a central issue in the debate regarding carbon stabilisation and meeting the goals of the Kyoto Protocol.

From 1982 to 1996 the number of households in the United States increased at a rate of 1.4% per annum and residential electricity consumption increased at a rate of 2.6% per annum for the same period. Accordingly, the number of households in the United States is projected to increase by 1.1% per annum through to the year 2010 and residential electricity consumption is expected to increase at a rate of 1.6% per annum for the same period.

It was estimated in 1995 that approximately 40 million households worldwide used electric water heating systems. The most common form of electric hot water heating system involves a storage tank in which water is heated slowly over time to a predetermined temperature. The water in the storage tank is maintained at the predetermined temperature as water is drawn from the storage tank and replenished with cold inlet water. Generally, storage tanks include a submerged electrical resistance-heating element connected to the mains electricity supply whose operation is controlled by a thermostat or temperature-monitoring device.

Electric hot water storage systems are generally considered to be energy inefficient as they operate on the principle of storing and heating water to a predetermined temperature greater than the temperature required for usage, even though the consumer may not require hot water until some future time. As thermal energy is lost from the hot water in the storage tank, further consumption of electrical energy may be required to reheat that water to the predetermined temperature. Ultimately, a consumer may not require hot water for some considerable period of time. However, during that time, some electric hot water storage systems continue to consume energy to heat the water in preparation for a consumer requiring hot water at any time.

Of course, rapid heating of water such that the water temperature reaches a predetermined level within a short period of time enables a system to avoid the inefficiencies that necessarily occur as a result of storing hot water. Rapid heating or "instant" hot water systems are currently available where both gas, such as natural gas or LPG (Liquefied Petroleum Gas) and electricity are used as the energy source. In the case of natural gas and LPG, these are fuel sources that are particularly well suited to the rapid heating of fluid as the ignition of these fuels can impart sufficient thermal energy transfer to fluid and raise the temperature of that fluid to a satisfactory level within a relatively short time under controlled conditions.

However, whilst it is possible to use natural gas fuel sources for the rapid heating of water, these sources are not always readily available. In contrast, an electricity supply is readily available to most households in developed nations.

There have been previous ineffective attempts to produce an electrical "instant" hot water system. These include the hot wire and the electromagnetic induction systems. The hot wire "instant" hot water system has been developed wherein a wire is located in a thermally and electrically non-conductive tube of a relatively small diameter. In operation, water passes through the tube in contact with or in very close proximity to the wire, which is energised to thereby transfer thermal energy to the water in the tube. Control is generally affected by monitoring the output temperature of water from the tube and comparing it with a predetermined temperature setting. Dependent upon the monitored output temperature of the water, a voltage is applied to the wire until the temperature of the water reaches the desired predetermined temperature setting. Whilst this type of system avoids the energy inefficiencies involved with the storage of hot water, it unfortunately suffers a number of other disadvantages. In particular, it is necessary to heat the wire to temperatures much greater than that of the surrounding water. This has the disadvantageous effect of causing the formation of crystals of dissolved salts normally present in varying concentrations in water such as calcium carbonate and calcium sulphate. Hot areas of the wire in direct contact with the water provide an excellent environment for the formation of these types of crystals which results in the wire becoming "caked" and thus reducing the efficiency of thermal transfer from the wire to the surrounding water. As the tube is generally relatively small in diameter, the formation of crystals can also reduce the flow of water through the tube. In addition, hot wire type systems require relatively high water pressures for effective operation and thus these systems are not effective for use in regions that have relatively low water pressure or frequent drops in water pressure that may occur during times of peak water usage.

The electromagnetic induction system functions like a transformer. In this case currents induced into a secondary winding of the transformer cause the secondary winding to heat up. The heat generated here is dissipated by circulating water through a water jacket that surrounds the secondary winding. The heated water is then passed out of the system for usage. Control is generally affected by monitoring the output temperature of water from the water jacket and comparing it with a predetermined temperature setting. Dependent upon the monitored output temperature of the water, voltage applied to the primary winding can be varied, which varies the electric currents induces in the secondary winding until the temperature of the water reaches the desired predetermined temperature setting. Whilst this type of system avoids the energy inefficiencies involved with the storage of hot water, it also suffers a number of other disadvantages. In particular, it is necessary to heat the secondary winding to temperatures greater than that of the surrounding water. This has the same effect of causing the formation of crystals of dissolved salts as discussed above. As the gap between the secondary winding and the surrounding water jacket is generally relatively narrow, the formation of crystals can also reduce the flow of water through the jacket.

In addition, the magnetic fields developed and the high currents induced in the secondary winding may result in unacceptable levels of electrical or RF noise. This electrical or RF noise can be difficult to suppress or shield, and affects other electromagnetic susceptible devices within range of the electromagnetic fields.

It is therefore desirable to provide apparatus for rapid heating of fluid, particularly water, using electrical energy and which obviates at least some of the disadvantages of other systems.

It is also desirable to provide an improved method for rapidly heating water using electrical energy which minimises power consumption.

It is also desirable to provide an improved system for heating water using electrical energy which provides relatively rapid water heating suitable for domestic and/or commercial purposes.

It is also desirable to provide an improved apparatus and method for electric fluid heating which facilitates control of the output temperature whilst minimising formation of crystals of dissolved salts.

It is also desirable to provide an improved fluid heating system which uses mains power generally available in domestic and commercial buildings.

It is also desirable to provide an improved heating apparatus which can be manufactured in various capacities of fluid throughput.

It is also desirable to provide fluid heating apparatus which can be designed to operate with a variety of fluids or with water of varying hardness.

It is also desirable to provide fluid heating apparatus which can be installed in close proximity to the hot water outlet, thereby reducing the time delay of the arrival of hot water and thereby obviating unnecessary wastage of water.

It will be understood that any discussion of devices, articles or the like which has been included in this specification is solely for the purpose of providing a context for the present invention. It is not to be taken as an admission that any or all of these matters either form part of the prior art base or were common general knowledge in the field relevant to the present invention as it existed before the priority date of each claim of this application.

SUMMARY OF THE INVENTION

In accordance with one aspect of the invention there is provided apparatus for heating fluid comprising passageway means defining a flow path for the fluid to be heated, upstream fluid temperature measuring means to measure the temperature of fluid to be heated, a plurality of sets of electrode means in or forming the flow path and between which said fluid passes, said sets of electrode means including at least first and second electrode sets along the fluid flow path, said first electrode set and said second electrode set both having at least one pair of electrodes between which an electric current is passed through the said fluid to heat the fluid during its passage along the flow path, first downstream temperature measuring means downstream of the second electrode set, fluid flow rate determining means, and electrical control means to supply and control electrical power to the electrodes of each set, said control means having processing means to relate current flow and applied voltage in response to measured upstream and downstream temperatures and fluid flow rate to determine desired power input to the fluid from each electrode set to achieve a desired fluid temperature downstream of the second electrode set.

Preferably, the passageway means comprises an annular space between spaced, substantially coaxial cylindrical members. The passageway means may define a plurality of parallel flow paths for the fluid.

In one embodiment, a second temperature measuring means measures the temperature of the fluid between the first and second electrode sets, and the control means controls power to the first and second electrode sets in accordance with the measured temperatures and a desired fluid temperature increase in the passage of the fluid between the respective electrode sets.

In a preferred embodiment, the electrode means comprises at least three pairs of electrodes spaced along the flow path. The electrodes of each pair are spaced across the flow path so that voltage applied between the electrodes of each pair causes current to flow through the fluid across the flow path as the fluid passes along the passageway means.

In one preferred embodiment, the electrode means comprises cylindrical, substantially coaxial electrodes forming or located in a section of the passageway means. Preferably, the passageway means includes three sections, each passageway section having an inlet and an outlet, the sections being connected together in series such that the outlet of a first section comprises the inlet of the second section, and the outlet of the second section comprises the inlet of the third section, with electrodes for each of the three sections.

With this arrangement, the outlets of the first and second sections have fluid temperature measuring means, and the control means controls the power to the electrodes of each section in accordance with the measured inlet and outlet temperatures of each section and a predetermined desired temperature difference.

In a preferred embodiment, each passageway section is formed by spaced, substantially coaxial cylindrical electrodes defining an annular flow path for the fluid.

In another embodiment, the passageway means includes more than three passageway sections, each section having an inlet and an outlet, the sections being connected in series and the control means controlling power to an electrode pair of each section in accordance with measured inlet and outlet temperatures of each section and a predetermined desired temperature difference for each section.

In preferred embodiments of the invention, control of the electrical power being passed to the fluid is provided by a microcomputer controlled management system. The microcomputer controlled management system is preferably able to detect and accommodate changes in the specific conductance of the fluid itself due to the change in temperature of the fluid within the system itself, as well as variances in electrical conductivity of the incoming fluid. That is, in preferred embodiments of the present invention, the management system monitors and responds to an electrical conductivity, or specific conductance gradient between the input and output of elements of the heating system. In an instant fluid heating system in accordance with an embodiment of the present invention used for domestic water heating, fluctuations in incoming water electrical conductivity can also be caused by factors such as varying water temperatures and varying concentrations of dissolved chemicals and salts, and such variations should be managed as a matter of course. However, preferred embodiments of the present invention will also manage and respond to changes in the electrical conductivity of the fluid as it is heated within the system itself, that is, the effective management of the specific conductance gradient.

According to another aspect of the invention there is provided a method for heating fluid comprising the steps of:
passing fluid along a fluid path;
providing at least two sets of electrodes spaced along the fluid path;
applying a variable electrical voltage between the electrodes of each set to thereby pass electrical currents through the fluid between electrodes of each set;
monitoring fluid path inlet fluid temperature;
monitoring fluid path outlet fluid temperature;
monitoring the currents passing through the fluid between electrodes of each electrode set in response to application of the variable electrical voltage; and
controlling the variable electrical voltage between electrodes of each electrode set in response to the specific conductance of the fluid as determined by reference to the monitored fluid temperatures and current flows for a given fluid flow in each section of the flow path such that an amount of electrical power passed to the fluid corresponds to a predetermined temperature increase of the fluid.

In preferred embodiments of the method of the present invention, additional further steps may be carried out comprising:

Compensating for a change in the electrical conductivity of the fluid caused by varying temperatures and varying concentrations of dissolved chemicals and salts, and through the heating of the fluid, by altering the variable electrical voltage to accommodate for changes in specific conductance when increasing the fluid temperature by the desired amount.

Such a step may be performed by controlling the electrical power applied to the electrode sets to maintain the required constant fluid temperature increase in that electrode segment. The variable electrical voltage may then be adjusted to compensate for changes in specific conductance of the fluid within the segment of the flow path associated with each electrode pair, which will affect the current drawn by the fluid in that segment. The changes in specific conductance of the fluid passing through the separate electrode segments can be managed separately in this manner. Therefore the system is able to effectively control and manage the resulting specific conductance gradient across the whole system.

Similarly, the system of the present invention preferably further comprises means to manage the changes in specific conductance of the fluid caused by heating of the fluid. Such means may comprise a temperature sensor for measuring the system output fluid temperature for comparison to the input fluid temperature of each section in order to determine whether a desired temperature increase of the fluid has been achieved.

In preferred embodiments, a temperature sensor is placed upstream from the electrode segments to supply a signal representative of the temperature of the fluid prior to its passage between the electrode segments. With the temperature sensor placed upstream of the electrode segments, a temperature difference may be determined between the inlet fluid and a desired temperature of the outlet fluid. The desired temperature of the outlet fluid may be adjusted by a user via an adjustable control means.

The volume of fluid passing between any set of electrodes may be accurately determined by measuring the dimensions of the passage within which the fluid is exposed to the electrodes taken in conjunction with fluid flow.

Similarly, the time for which a given volume of fluid will receive electrical power from the electrodes may be determined by measuring the flow rate of fluid through the passage. The temperature increase of the fluid is proportional to the amount of electrical power applied to the fluid. The amount of electrical power required to raise the temperature of the fluid a known amount, is proportional to the mass (volume) of the fluid being heated and the fluid flow rate through the passage. The measurement of electrical current flowing through the fluid can be used as a measure of the electrical conductivity, or the specific conductance of that fluid and hence allows determination of the required change in applied voltage required to keep the applied electrical power constant. The electrical conductivity, and hence the specific conductance of the fluid being heated will change with rising temperature, thus causing a specific conductance gradient along the path of fluid flow.

The energy required to increase the temperature of a body of fluid may be determined by combining two relationships:

Relationship (1)

$$\text{Energy} = \text{Specific Heat Capacity} \times \text{Density} \times \text{Volume} \times \text{Temp-Change}$$

or

The energy per unit of time required to increase the temperature of a body of fluid may be determined by the relationship:

$$\text{Power}(P) = \frac{\text{Specific Heat Capacity}(SHC) \times \text{Density} \times \text{Vol}(V) \times \text{Temp-Change}(Dt)}{\text{Time}(T)}$$

For analysis purposes, the specific heat capacity of water may be considered as a constant between the temperatures of 0 degC. and 100 degC. The density of water being equal to 1, may also be considered constant. Therefore, the amount of energy required to change the temperature of a unit mass of water, 1 degC. in 1 second is considered as a constant and can be labelled "k". Volume/Time is the equivalent of flow rate (Fr). Thus:

The energy per unit of time required to increase the temperature of a body of fluid may be determined by the relationship:

$$\text{Power}(P) = \frac{k \times \text{Flow rate}(Fr) \times \text{Temp-Change}(Dt)}{\text{Time}(T)}$$

Thus if the required temperature change is known, the flow rate can be determined and the power required can be calculated.

In preferred embodiments of the present invention, the electrodes are segmented and input and output temperatures are measured. Measurement of the temperature allows the computing means of the microcomputer controlled management system to determine the voltage required to be applied to the electrodes in an electrode segment in order to supply a necessary amount of electrical power to the fluid in order to provide the necessary management of changes in the specific conductance of the fluid so as to increase the temperature of the fluid by a desired amount.

Typically, when a user requires heated water, a hot water tap is operated thus causing water to flow. This flow of water may be detected by a flow meter and cause the initiation of a heating sequence. The temperature of incoming water may be measured and compared with a preset desired temperature for water emitting from the system. From these two values, the required change in water temperature from inlet to outlet may be determined.

Of course, the temperature of the inlet water to the electrode segments may be repeatedly measured over time and as the value for the measured inlet water temperature changes, the calculated value for the required temperature change from inlet to outlet of the electrode segments can be adjusted accordingly. Similarly, with changing temperature, mineral content and the like, changes in electrical conductivity and therefore specific conductance of the fluid may occur over time. Accordingly, the current passing through the fluid will change causing the resulting power applied to the water to change. Repeatedly measuring the temperature outputs of the electrode segments over time and comparing these with the required output temperature values will enable repeated calculations to correct the voltage applied to the electrode segments.

In one preferred embodiment, a computing means provided by the microcomputer controlled managemerit system is used to determine the electrical power that should be applied to the fluid passing between the electrodes, by determining the value of electrical power that will effect the desired temperature change between the electrode segment inlet and outlet, measuring the effect of changes to the specific conductance of the water and the thereby calculate the voltage that needs to be applied for a given flow rate.

Control of Electrical Power

In preferred embodiments of the present invention, the electrical current flowing between the electrodes within each electrode segment, and hence through the fluid, is measured. The electrode segment input and output temperatures are also measured. Measurement of the electrical current and temperature allows the computing means of the microcomputer controlled management system to determine the power required to be applied to the fluid in an electrode segment to increase the temperature of the fluid by a desired amount.

The current passing through the fluid will change. The current passing through the fluid is preferably measured repeatedly over time to enable repeated calculations, which allows the electrical power applied to the electrode segments to remain at the appropriate value.

In one embodiment, the computing means provided by the microcomputer controlled management system determines the electrical power that should be applied to the fluid passing between the electrodes and the thereby calculate the average voltage that needs to be applied to keep the temperature change substantially constant.

Relationship (2) below, facilitates the calculation of the electrical power to be applied as accurately as possible, almost instantaneously. This eliminates the need for unnecessary water usage otherwise required to initially pass through the system before facilitating the delivery of water at the required temperature. This provides the potential for saving water.

In the preferred embodiments, having determined the electrical power that should be supplied to the fluid passing between the electrodes, the computing means may then calculate the voltage that should be applied to each Electrode Segment (ES) as follows if the Power required for the electrode segment can be calculated, and the current drawn by the electrode segment (n) can be measured:

Relationship (2)

Voltage $ES_n(Vapp_n) = $ Power $ES_n$ ($Preq_n$)/Current $ES_n(Is_n)$ $Vapp_n = Preq_n/Is_n$ As part of the initial heating sequence, the applied voltage may be set to a relatively low value in order to determine the initial specific conductance of the fluid passing between the electrodes. The application of voltage to the electrodes will cause current to be drawn through the fluid passing therebetween thus enabling determination of the specific conductance of the fluid, as it is directly proportional to the current drawn therethrough. Accordingly, having determined the electrical power that should be supplied to the fluid flowing between the electrodes in the electrode segments, it is possible to determine the required voltage that should be applied to those electrodes in order to increase the temperature of the fluid flowing between the electrodes in the electrode segments by the required amount. The instantaneous current being drawn by the fluid is preferably continually monitored for change along the length of the heating path. Any change in instantaneous current drawn at any position along the heating path is indicative of the change in electrical conductivity or specific conductance of the fluid. The varying values of specific conductance apparent in the fluid passing between the electrodes in the electrode segments, effectively defines the specific conductivity gradient along the heating path.

Preferably, various parameters are continuously monitored and calculations continuously performed to determine the electrical power that should be supplied to the fluid and the voltage that should be applied to the electrodes in order to raise the temperature of the fluid to a preset desired temperature in a given period.

BRIEF DESCRIPTION OF THE DRAWINGS

Embodiments of the invention will now be described with reference to the accompanying drawings in which.

DETAILED DESCRIPTION OF DESCRIBED EMBODIMENTS OF THE INVENTION

Figure 1:
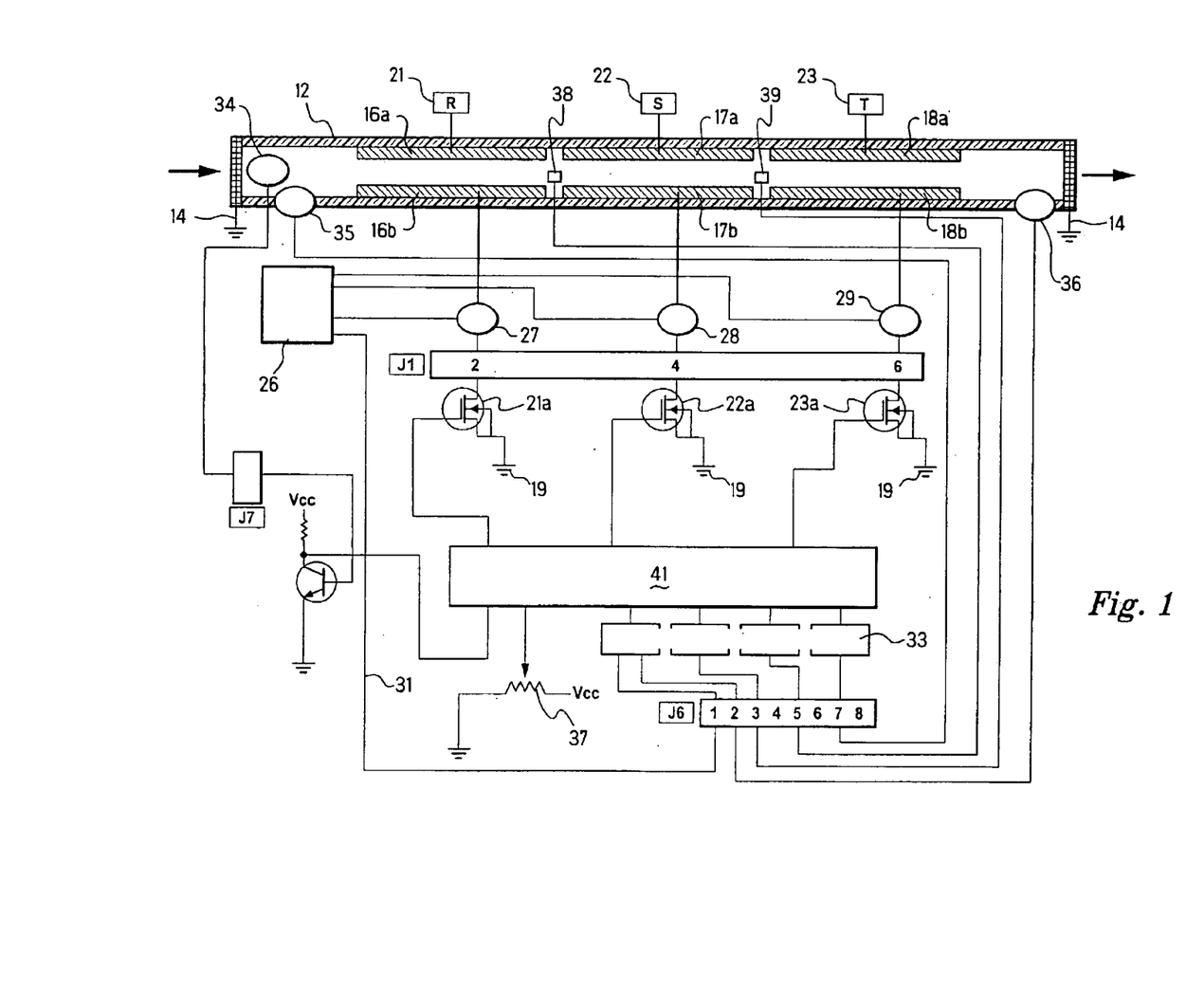
FIG. 1 is a schematic block diagram of a rapid heating system according to one embodiment of the present invention.

Referring to the drawings, FIG. 1 shows a schematic block diagram of a heating system of one embodiment in which water is caused to flow through a pipe or tube 12. The tube 12 is preferably made from a material that is electrically non-conductive, such as synthetic plastic material. However, the tube 12 is likely to be connected to metallic water pipe, such as copper tubing, that is electrically conductive. Accordingly, earth straps 14 are included at each end of the tube 12 for electrically earthing any metal tubing connected to the tube 12. The earth straps 14 would ideally be connected to an electrical earth of the electrical installation in which the heating system of the embodiment was installed. As the earth straps may draw current from an electrode through water passing through the tube 12, activation of an earth leakage circuit breaker or residual current device (RCD) may be effected. In a particularly preferred form of this embodiment, the system includes earth leakage circuit protective devices.

The tube 12, which defines the fluid flow path, is provided with three sets of electrodes 16, 17 and 18. The electrode material may be any suitable metal or a non-metallic conductive material such as conductive plastics material, carbon impregnated material or the like. It is important that the electrodes are selected of a material to minimise chemical reaction and/or electrolysis.

One of each electrode pair 16b, 17b and 18b is connected to a common switched return path 19 via separate voltage supply power control devices 21a, 22a and 23a while the other of each electrode pair 16a, 17a and 18a are connected to the incoming three phase voltage supply 21, 22 and 23. The separate voltage supply power control devices 21a, 22a and 23a switch the common return in accordance with the power management control. The total electrical current supplied to the electrodes is measured by the current measurement device 26, while the current supplied to each individual pair of electrodes 16, 17 and 18 is measured by current measuring devices 27, 28 and 29, respectively. A signal representing the total current is supplied as an input signal along line 31 via plug J6 and signal input interface 33 to power supply controller 41. The power supply controller 41 also receives signals directly from a flow measurement device 34 located in the tube 12 and a temperature setting device 37 by which a user can set a desired output fluid temperature, and additional signals via the plug J6 and signal input interface from an input temperature measurement device 35 to measure the temperature of input fluid to the tube 12, an output temperature measurement device 36 measuring the temperature of fluid exiting the tube 12, a first intermediate temperature measurement device 38 to measure fluid temperature between the electrodes 16 and 17, and a second intermediate temperature measurement device 39 to measure the temperature of fluid between the set of electrodes 17 and 18.

The power controller 41 receives the various monitored inputs and performs necessary calculations with regard to desired electrode pair voltages to provide a calculated power to be supplied to the fluid flowing through the tube 12. The power controller 41 controls the pulsed supply of voltage from each of the three separate phases connected to each of the electrode pairs 16, 17 and 18. Each pulsed voltage supply is separately controlled by the separate control signals from the power controller 41 to each voltage supply power control device 21a, 22a and 23a.

It will therefore be seen that, based upon the various parameters for which the power controller 41 receives representative input signals, a computing means under the control of a software program within the power controller 41 calculates the control signals required by the respective voltage supply power control device 21a, 22a and 23a in order to supply a the required electrical power to impart the required temperature change in the water flowing through the tube 12 so that heated water is emitted from the tube 12 at the desired temperature set by the set temperature device 37.

When a user sets the desired output water temperature using the set temperature device 37, the set value is captured by the power controller 41 and stored in a system memory until it is changed or reset. Preferably, a predetermined default value is retained in the memory, and the set temperature device 37 may provide a visual indication of the temperature set. The power controller 41 may have a preset maximum for the set temperature device 37 which represents the maximum temperature value above which water may not be heated. Thus, the value of the set temperature device 37 cannot be greater than the maximum set value. The system may be designed so that, if for any reason, the temperature sensed by the output temperature device 36 was greater than the set maximum temperature, the system would be immediately shut down and deactivated.

The system is actuated when water flow is detected by the flow measurement device 34 via plug J7. This causes initiation of a heating sequence. The temperature of incoming water is measured by the input temperature device 35 and this value is captured by the input interface 33 and recorded in the system memory. With the set temperature device 37 having a set or default temperature value, the required change in water temperature is easily determined, being the difference in the set temperature and measured input temperature. Of course, the temperature of the inlet water is repeatedly measured and if the value changes, the calculated temperature difference also varies.

The computing means is then able to determine the electrical power that needs to be applied to the water flowing through the tube 12 in order to increase its temperature from the measured input temperature to the set temperature. Having calculated the electrical power that needs to be applied to the flowing water, the computing means is then able to calculate the voltage that needs to be applied between the pairs of electrodes 16, 17 and 18 to thereby cause the required current to flow through the water.

As part of an initial heating sequence, the applied voltage is set to a predetermined low value in order to calculate the water conductivity, or specific heat capacity. The application of this voltage to the water will cause current to be drawn, and the current measuring device 26 will measure the drawn current and provide a signal to the input interface 33. The value of the total current is also measured periodically.

The control system then performs a series of checks to ensure that:

(a) the water temperature at the outlet does not exceed the maximum allowable temperature;

(b) leakage of current to earth has not exceeded a predetermined set value; and (c) system current does not exceed a preset current limit of the system.

These checks are repeatedly performed while the unit is operational and if any of the checks reveals a breach of the controlling limits, the system is immediately deactivated.

When the initial system check is satisfactorily completed, a calculation is performed to determine the required voltage that must be applied to the water flowing through the tube 12 in order to change its temperature by the desired amount. The calculated voltage is then applied to the pairs of electrodes 16, 17 and 18 so as to quickly increase the water temperature as it flows through the tube 12.

As the water flowing through the tube 12 increases in temperature from the inlet end of the tube, the conductivity changes in response to increased temperature. The first and second intermediate temperature measuring devices 38 and 39 and the output temperature measuring device 36 measure the incremental temperature increases in the three segments of the tube 12 containing the electrodes 16, 17 and 18. The voltage then applied across the respective pairs of electrodes 16, 17 and 18 can then be varied to take account of the changes in water conductivity to ensure that an even temperature rise occurs along the length of the tube 12, to maintain a substantially constant power input by each of the sets of electrodes and to ensure greatest efficiency and stability in water heating between the input temperature measurement and the output temperature measurement. The power supplied to the flowing water is changed by increasing or decreasing the number of control pulses supplied to power control devices 21a, 22a and 23a. The serves to increase or decrease the power supplied by individual electrode pairs 16, 17 and 18 to the water.

It will be seen that the system repeatedly monitors the water for changes in conductivity by continuously interrogating the system current measurement device 26 and the individual current measuring devices 27, 28 and 29, and the temperature measurement devices 35, 36, 38 and 39. Any changes in the values for the water temperatures as detected along the length of the tube 12 or changes in the detected currents cause the computing means to calculate revised average voltage values to be applied across the electrode pairs. Constant closed loop monitoring of changes to the system current, individual electrode currents, electrode segment water temperature causes recalculating of the voltage to be applied to the individual electrode segments to enable the system to supply the appropriate stable power td the water flowing through the heating system.

Figure 2:
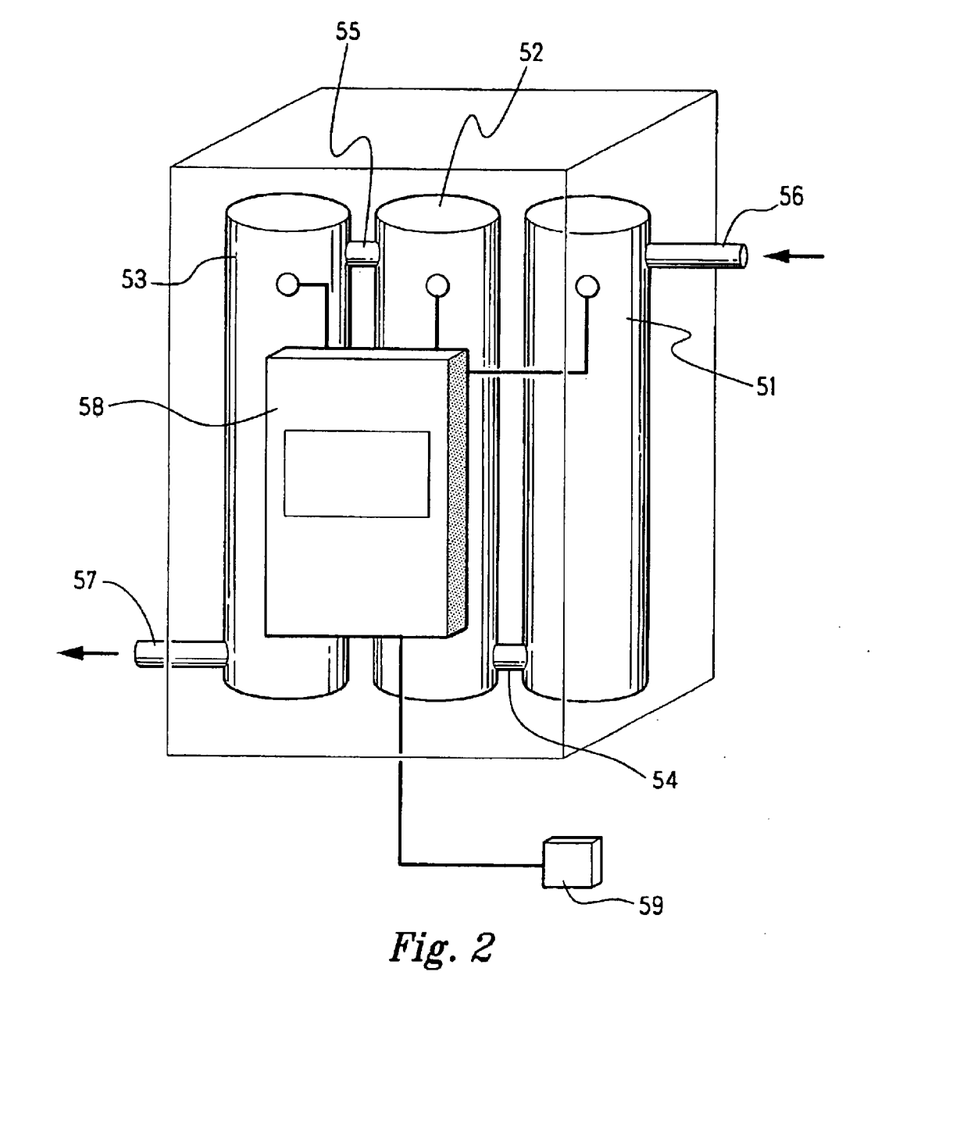
FIG. 2 is a legend of some of the symbols used in FIG. 1.

FIG. 2 illustrates another representation of the embodiment of the invention in which the water is caused to flow through three cells 51, 52 and 53 which are connected together by connecting pipes 54 and 55. A water inlet pipe 56 enables water to be supplied to the cells 51, 52 and 53 and a water outlet pipe 57 conveys water from the system.

The system is controlled by a control unit 58 mounted on one side of the system, and the control unit 58 is connected to a source of mains power at 59. With the system of this embodiment, each individual cell 51, 52 and 53 houses one set of electrodes between which the water flowing through the system passes. Each cell, therefore, receives water at an inlet temperature determined by the relative positioning of the cell.

The control system of this embodiment operates in a similar manner to that described above. The inlet and outlet temperatures of the water flowing through each cell are continuously measured and the voltages applied between the electrodes of each cell are controlled so that the required power is supplied in each cell to evenly raise the temperature of the water flowing from the inlet pipe 56 to the outlet pipe 57.

Figure 3:
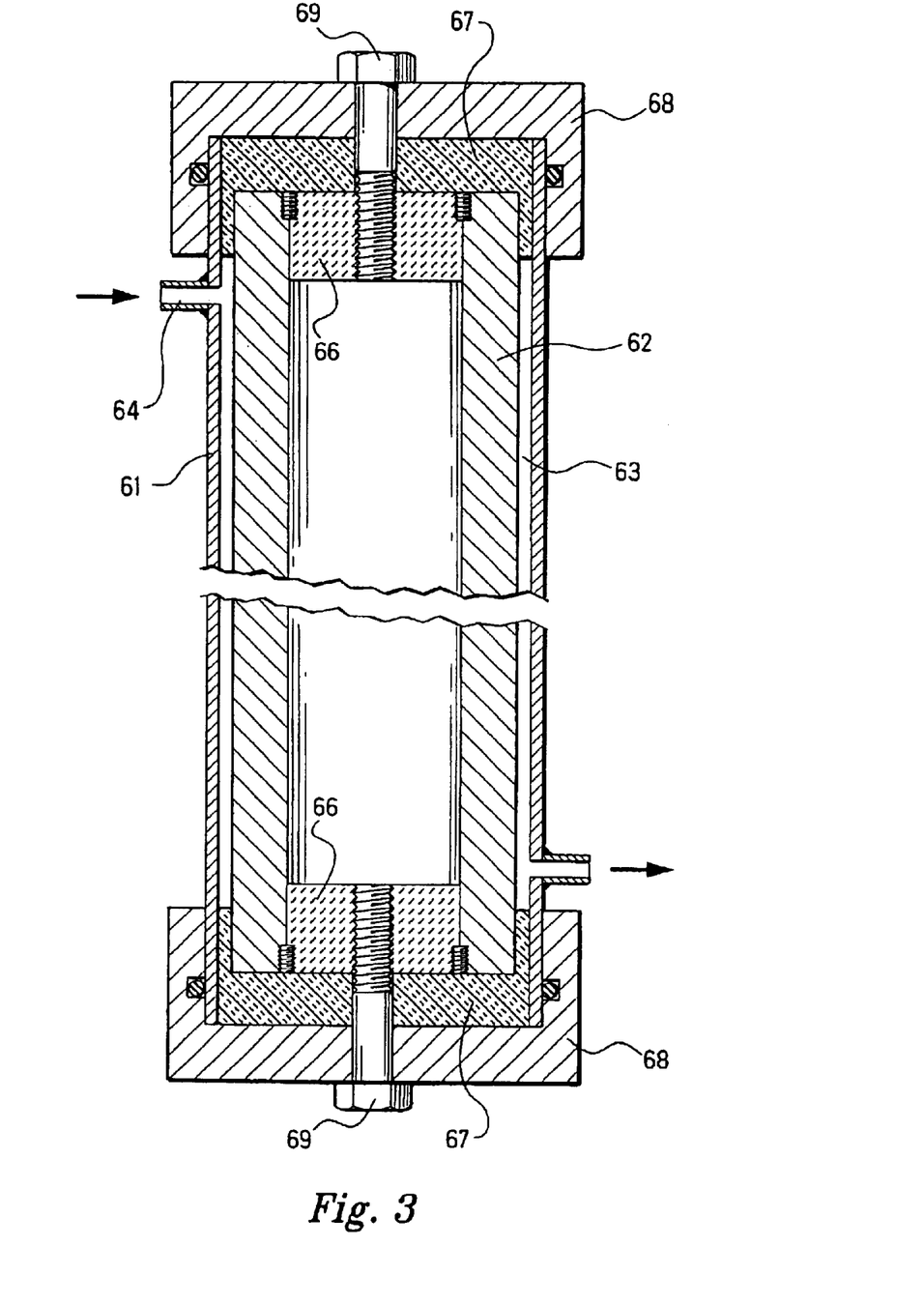
FIG. 3 is an illustration of one form of electrode segment assembly in accordance with an embodiment of the invention.

Referring to FIG. 3, the individual cells of FIG. 2 may each comprise a pair of coaxial electrodes 61 and 62, radially spaced to define an annular fluid flow path 63. The outer electrode 61 is formed of a tube of electrically conductive material and a fluid inlet 64 enables fluid to pass into the annular flow path 63 between the electrodes 61 and 62.

The inner electrodes 62 may also comprise a tube of electrically conductive material coaxially mounted within the outer electrode 61. The coaxial mounting may comprise a plug 66 fastened in one end of the inner electrode 62 a spacer 67 engaged over the end of the inner electrode 62 and within the end of the outer electrode 61, and an end cap 68 fastened to the plug 66 by a bolt 69. The spacer 67 is an interference or close fit within the annular space between the inner and outer electrodes 61 and 62 to thereby seal that space and confine fluid to the flow path without fluid leakage.

A cell formed in this manner enables a voltage to be applied between the inner and outer electrodes 61 and 62 such that current is able to flow between the surfaces of the electrodes and through the fluid flowing through the annular flow path 63. Connections for electrical supply to the inner electrode 62 may be through the end plug 66 and end cap 68.

The outer electrode 61 may be encased in an insulating material to provide a safe electrical environment for the water heating system. Such an insulating material may comprise a plastic tube or the like which closely engages the external surface of the outer electrode 61.

It will be appreciated that any number of sets of electrodes may be used in the performance of the present invention. Thus, while the embodiments described show three electrode pairs, the number of electrodes may be increased or decreased in accordance with individual requirements for fluid heating. If the number of electrodes is increased to, for example, six pairs, each individual pair may be individually controlled with regards to electrode voltage in the same way as is described in relation to the embodiments herein.

What is claimed is:

1. An apparatus for heating fluid comprising passageway means defining a flow path for the fluid to be heated, upstream fluid temperature measuring means to measure the temperature of fluid to be heated, a plurality of sets of electrode means in or forming the flow path and between which said fluid passes, said sets of electrode means including at least first and second electrode sets along the fluid flow path, said first electrode set and said second electrode set both having at least one pair of electrodes between which an electric current is passed through the said fluid to heat the fluid during its passage along the flow path, first downstream temperature measuring means downstream of the second electrode set, fluid flow rate measuring means, and electrical control means to supply and control electrical power to the electrodes of each set, said control means having processing means to relate current flow and applied voltage in response to measured upstream and downstream temperatures and fluid flow rate to determine desired power input to the fluid from each electrode set to achieve a desired fluid temperature downstream of the second electrode set.

2. An apparatus according to claim 1 wherein said passageway means comprises an annular space between spaced, substantially coaxial cylindrical members.

3. An apparatus according to claim 1 wherein a second temperature measuring means measures the temperature of the fluid between the first and second electrode sets, and the control means controls power to the first and second electrode sets in accordance with the measured temperatures and a desired fluid temperature increase in the passage of the fluid between the respective electrode sets.

4. An apparatus according to claim 1 wherein said plurality of sets of electrode means includes a third electrode set positioned downstream of said second electrode set, and a third downstream temperature measuring means measures the fluid temperature downstream of the third electrode set.

5. An apparatus according to claim 1 wherein the electrode means comprises cylindrical, substantially coaxial electrodes defining separate sections of the passageway means along the flow path(s).

6. An apparatus according to claim 1 wherein said passageway means includes three sections, each passageway section having an inlet and an outlet, the sections being connected together in series such that the outlet of a first section communicates with the inlet of the second section, and the outlet of the second section communicates with the inlet of the third section, with a set of electrodes for each section.

7. An apparatus according to claim 6 wherein the outlets of each of the first second and third sections have fluid temperature measuring means, and said control means controls the power to the electrodes of each section in accordance with the sensed inlet and outlet temperatures of each section and a predetermined desired temperature difference.

8. An apparatus according to claim 6 wherein each passageway section is formed by spaced substantially coaxial cylindrical electrodes defining an annular flow path for the fluid.

9. An apparatus according to claim 1 wherein said passageway means includes more than three passageway sections, each section having an inlet and outlet, the sections being connected in series and the control means controlling power to an electrode pair of each section in accordance with measured inlet and outlet temperatures of each section, and a predetermined desired temperature difference.

10. An apparatus according to claim 7 wherein the predetermined desired temperature difference is determined in relation to applied voltage between the respective electrodes and current drawn, inlet and outlet temperatures of the sections, fluid flow and upstream and downstream measures temperatures.

11. An apparatus according to claim 1 wherein the control means supplies a varying voltage to the electrode pairs at a pulse frequency which is sub-multiple of mains supply voltage frequency, and control of the power supplied to the electrodes includes varying the number of pulses per unit time.

12. An apparatus according to claim 1 wherein said passageway means defines a plurality of parallel flow paths for said fluid, each flow path having a plurality of sets of electrode means in or forming the flow path.

13. A method for heating fluid comprising the steps of:
passing fluid along a fluid path;
providing at least two sets of electrodes spaced along the fluid path;
applying a variable electrical voltage between the electrodes of each set to thereby pass electrical currents through the fluid between electrodes of each set;
monitoring fluid path inlet fluid temperature;
monitoring fluid path outlet fluid temperature;
monitoring the currents passing through the fluid between electrodes of each electrode set in response to application of the variable electrical voltage; and
controlling the variable electrical voltage between electrodes of each electrode set in response to the specific conductance of the fluid as determined by reference to the monitored fluid temperatures and current flows for a given fluid flow in each section of the flow path such that an amount of electrical power passed to the fluid corresponds to a predetermined temperature increase of the fluid.

14. A method for heating fluid according to claim 13 including the step of monitoring the temperature of the fluid between the electrode sets.

15. A method for heating fluid according to claim 13 including the step of controlling the electrical power passed to the fluid by a microcomputer controlled management system.

16. A method for heating fluid according to claim 13 including the step of managing and responding to changes in the electrical conductivity of the fluid as it is heated within the system in conjunction with measured fluid flow, fluid inlet temperature, and desired rate of temperature rise.

17. A method for heating fluid according to claim 13 including the step of compensating for a change in the electrical conductivity of the fluid caused by varying temperatures and varying concentrations of dissolved chemicals and salts, and through the heating of the fluid, by altering the average electrical voltage to accommodate for changes in specific conductance when increasing the fluid temperature by the desired amount.

18. A method for heating fluid according to claim 13 including the steps of providing at least three sets of electrodes in the fluid flow, applying an electrical voltage between electrodes of each pair in accordance with monitored temperatures of fluid at locations upstream and downstream of the electrode pairs.

19. A method for heating fluid according to claim 18 including the steps of monitoring the temperature of the fluid in the flow path on either side of each pair of electrodes, separately controlling the electrical power applied to the electrode pairs of each set of electrodes to maintain a required constant fluid temperature increase in that segment of fluid flow adjacent the respective electrode pairs.

20. A fluid heating system comprising at least one flow path for the fluid to be heated and having a fluid inlet, inlet fluid temperature measuring means, at least two pairs of electrodes in or defining the fluid path, the electrode pairs being spaced along the flow path, downstream fluid temperature measuring means downstream of each electrode pair, fluid flow rate measuring means, electrical control means to supply and control electrical power to the electrodes of each pair, said control means having processing means to relate current flow, applied voltage, inlet fluid temperature, respective downstream fluid temperatures, and fluid flow rate to determine desired power input to the fluid by each electrode pair to achieve a desired outlet fluid temperature in a predetermined time.

21. A fluid heating system according to claim 20 wherein said flow path comprises an annular space between spaced, substantially coaxial cylindrical members.

22. A fluid heating system according to claim 20 wherein said cylindrical members constitute said electrodes.

23. A fluid heating system according to claim 20 having a plurality of parallel flow paths for said fluid, each flow path having a plurality of sets of electrode means in or forming the flow path.

24. A fluid heating system according to claim 20 wherein said flow path includes three sections, each section having an inlet and an outlet, the sections being connected together in series such that the outlet of a first section communicates with the inlet of the second section, and the outlet of the second section communicates with the inlet of the third section, with electrodes for each section.

25. A fluid heating system according to claim 20 wherein fluid temperature measuring devices are located adjacent each set of electrodes, and said control means controls the power to the electrodes of each section in accordance with the sensed inlet and outlet temperatures of each section and a predetermined desired temperature difference in each section.

26. A fluid heating system according to claim 20 wherein the control means supplies a voltage to the electrode pairs at a pulse frequency which is sub-multiple of mains supply voltage frequency, control of the power supplied to each pair of electrodes including control by varying the number of pulses.

* * * * *